United States Patent [19]

Hinson

[11] 4,416,042

[45] Nov. 22, 1983

[54] METHOD AND APPARATUS FOR RAISING THE RAM OF A VERTICAL MILLING MACHINE

[76] Inventor: Ashford J. Hinson, 19969 Poinciana Ave., Redford, Mich. 48240

[21] Appl. No.: 336,094

[22] Filed: Dec. 31, 1981

[51] Int. Cl.³ .................. B23B 47/26; B23B 1/02; B23Q 3/10
[52] U.S. Cl. .................................. 29/57; 409/235; 29/239; 29/256; 29/463; 29/401.1
[58] Field of Search ............. 29/239, 259, 256, 401.1, 29/426.1, 258, 57, 264, 463; 248/544, 656; 409/206, 216, 218, 209, 210, 235, 204, 230, 236, 237, 241, 229; 408/234, 236, 237; 254/231

[56] References Cited

U.S. PATENT DOCUMENTS

| | | | |
|---|---|---|---|
| 1,522,141 | 1/1925 | Raby | 29/256 |
| 1,865,420 | 6/1932 | Kick | 29/264 |
| 2,055,783 | 9/1936 | Bennett | 409/235 |
| 2,159,593 | 5/1939 | Klermund | 29/239 |
| 2,320,776 | 6/1943 | Gorton | 409/235 |
| 2,392,035 | 1/1946 | Fett | 409/216 |
| 2,421,324 | 5/1947 | Grahm | 29/256 |
| 2,456,917 | 12/1948 | Cheek | 29/239 |
| 2,463,691 | 3/1949 | Habenicht | 408/234 |
| 2,801,888 | 8/1957 | Najmowski | 409/204 |
| 2,949,063 | 8/1960 | Swanson et al. | 409/235 |
| 3,169,449 | 2/1965 | Adelt | 409/235 |
| 3,338,135 | 8/1967 | Muller | 409/235 |
| 4,266,893 | 5/1981 | Troger et al. | 409/236 |

Primary Examiner—Z. R. Bilinsky
Assistant Examiner—Thomas Kline
Attorney, Agent, or Firm—Barnes, Kisselle, Raisch, Choate, Whittemore & Hulbert

[57] ABSTRACT

The ram of a vertical milling machine is raised up from the machine base and then secured thereto in a raised position to accommodate a workpiece having a vertical dimension that is greater than the normal vertical clearance between the tool spindle on the ram and the work support table below the spindle. The method involves removing the bolts which mount the ram on the base, threading long guide screws into these bolt holes and supporting an inverted U-shaped bracket on nuts threaded on the guide screws such that the bracket is disposed in an elevated position above the ram. A lift screw is then extended downwardly through the bight portion of the bracket and is threaded into the conventional threaded eye bolt opening on the top side of the ram. Thereafter, a nut is threaded down on the lift screw against the top side of the bight section of the bracket and continued rotation of the nut causes the lift screw to be displaced upwardly to raise the ram as it is guided by the guide screws. After the ram is raised a desired extent, a spacer is placed between the ram and the base and the ram is then lowered by rotating the nut in the opposite direction until the ram rests upon the spacer. Thereafter the guide screws are replaced with the same or longer mounting bolts to again securely mount the ram on the base in a raised position.

10 Claims, 6 Drawing Figures

METHOD AND APPARATUS FOR RAISING THE RAM OF A VERTICAL MILLING MACHINE

This invention relates to a method and apparatus for elevating the ram of a vertical milling machine.

In a conventional vertical milling machine the ram is supported for swinging movement in a fixed horizontal plane at the upper end of the machine base. Although the work support table is vertically adjustable on the base and the machine spindle is also vertically shiftable on the ram, nevertheless, it sometimes happens that the height of a workpiece to be machined is greater than the maximum vertical clearance between the spindle and the work support table. Under such conditions the bolts which secure the ram to the base are loosened and the ram is raised so that a spacer can be inserted between the ram and the base and the ram thereafter again bolted to the base. The ram is a very heavy component of the machine and is raised by connecting a hoist to an eye bolt that is threaded into the upper end of the ram. While this mode of raising and lowering the ram is convenient where there is a hoist available, many smaller machine shops do not have such hoists and are, therefore, not equipped to raise and lower such rams.

The present invention has for its object a method and apparatus for raising and lowering the ram of a milling machine that avoids the necessity of using a hoist.

More specifically, in accordance with the present invention the ram may be raised and thereafter lowered by the simple expedient of rotating a nut on a simple fixture designed to be mounted on the machine. The fixture includes an inverted U-shaped bracket adapted to be mounted on the base in a fixed elevated position straddling the ram by means of a plurality of vertically extending guide screws. A lift screw extends downwardly through the bight section of the U-shaped bracket and is threaded into the threaded eye bolt opening that is conventionally provided on the ram for lifting the ram. A nut on the lift screw bears down on the top side of the bight portion of the bracket and, when rotated, displaces the screw upwardly and thereby elevates the ram to which the screw is secured. The ram is prevented from rotating by reason of the vertical guide screws. After the ram has been raised the desired extent, a spacer is inserted between the ram and the machine base and the guide screws are replaced by the same or longer mounting bolts to again secure the ram on the base in a raised position.

Other objects, features and advantages of the present invention will become apparent from the following description and accompanying drawings, in which.

Figure 1:
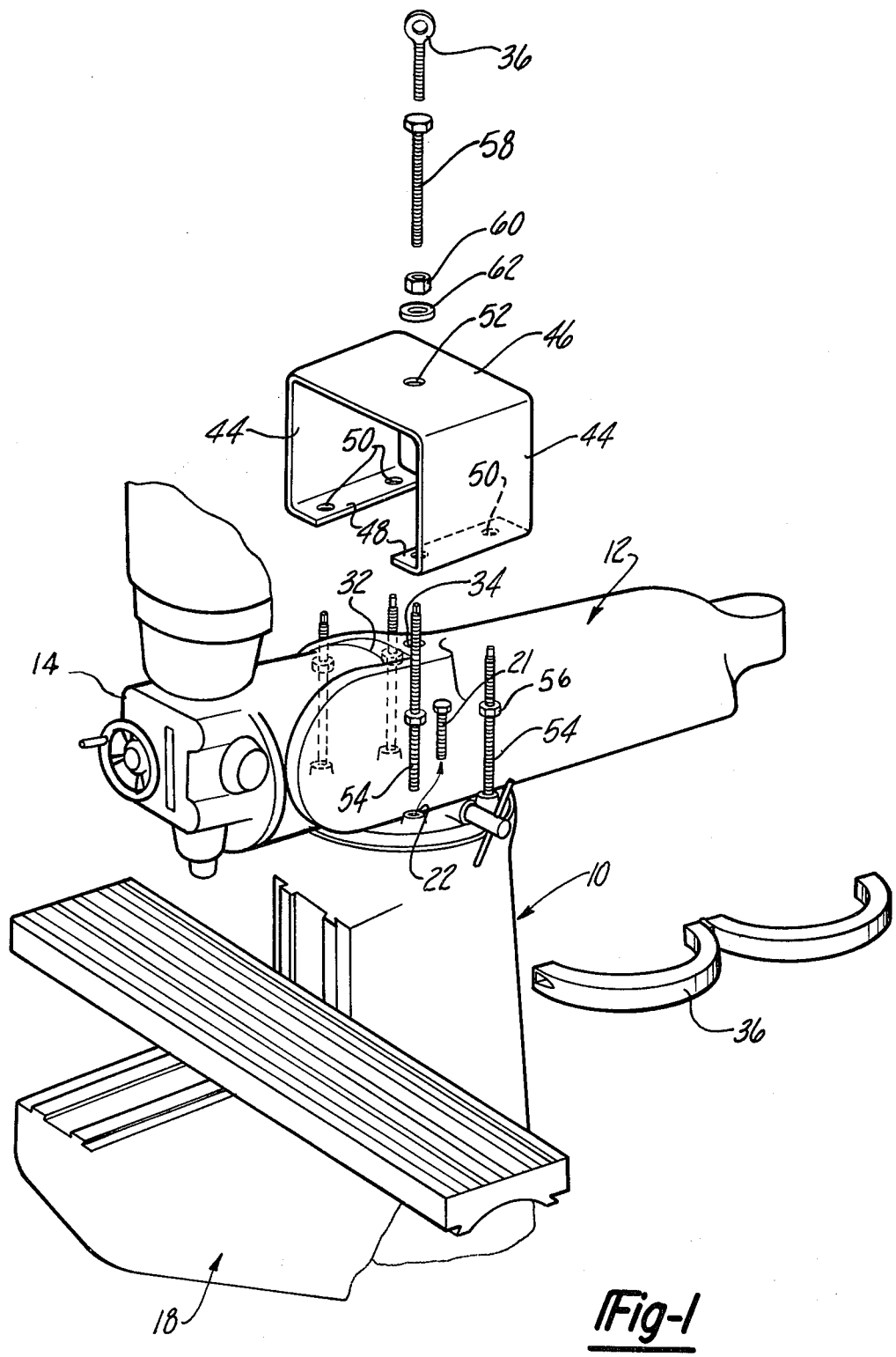
FIG. 1 is an exploded perspective view of a vertical milling machine and showing the manner in which the fixture of the present invention is arranged thereon.
Figure 2:
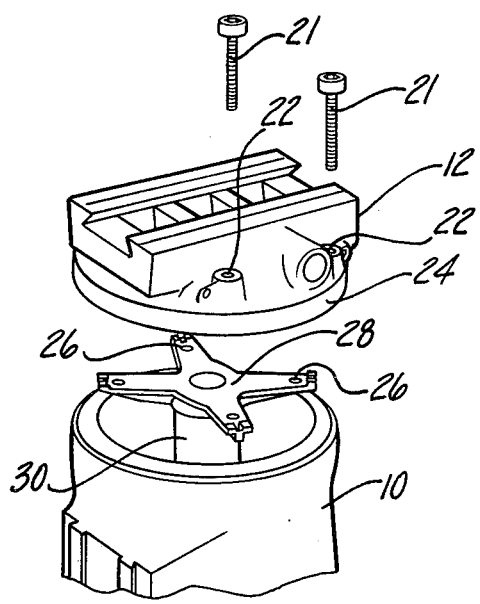
FIG. 2 is a fragmentary exploded perspective view of portions of the base and ram of a milling machine.

The vertical milling machine illustrated in FIG. 1 generally comprises a base 10 at the upper end of which is supported a ram 12 which in turn supports a tool head 14 which includes a motor-driven rotary spindle 16. A work support table 18 on base 10 is adapted to be vertically adjusted thereon by means of a crank 20. Referring to FIG. 2, the bottom component of ram 12 is normally mounted on base 10 by means of four screws 21 which extend downwardly through openings 22 in the flanged base 24 of ram 12 and thread into openings 26 of a saddle 28 supported in base 10 on a column 30. Ram 12 has a raised central portion 32 provided with a threaded opening 34 for receiving an eye bolt 36 that is normally employed for lifting the ram by means of a hoist.

When the vertical clearance space between the lower end of spindle 16 and the work supporting surface of table 18 is not sufficient to accommodate a workpiece having a relatively large vertical dimension, it becomes necessary to mount ram 12 on base 10 in a raised position with a spacer 36 therebetween. The fixture of the present invention enables raising the ram in a simple and expedient manner without requiring the need of a hoist. This fixture, generally designated 40, includes an inverted, U-shaped bracket 42 having a pair of vertical side legs 44 connected at their upper ends by a bight section 46. The lower ends of legs 44 are formed with inwardly turned flanges 48 provided with four openings 50. Flanges 48 are spaced apart and openings 50 are formed therein so as to vertically register with the four mounting bolt openings 22 on the base flange 24 of ram 12. The bight portion 46 of bracket 42 is formed with a central opening 52 which is adapted to be vertically aligned with the eye bolt opening 34 in ram 12 when the openings 50 in flanges 48 register with the openings 22 in the ram.

Figure 3:
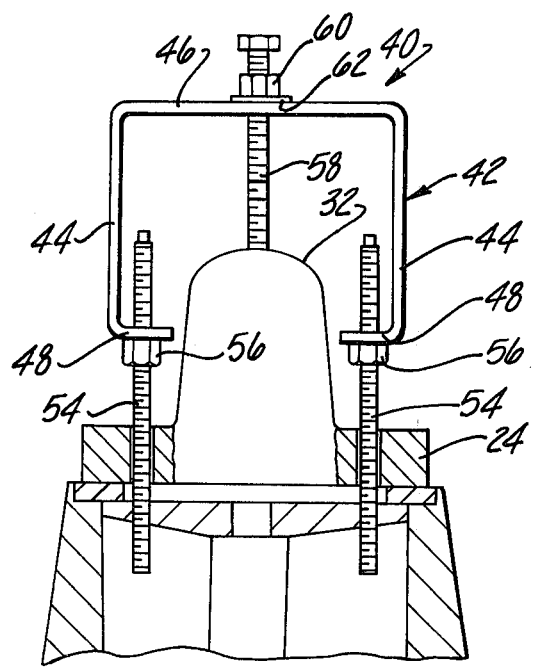
FIG. 3 is a fragmentary vertical sectional view showing the manner in which the fixture of this invention is mounted on the milling machine.
Figure 4:
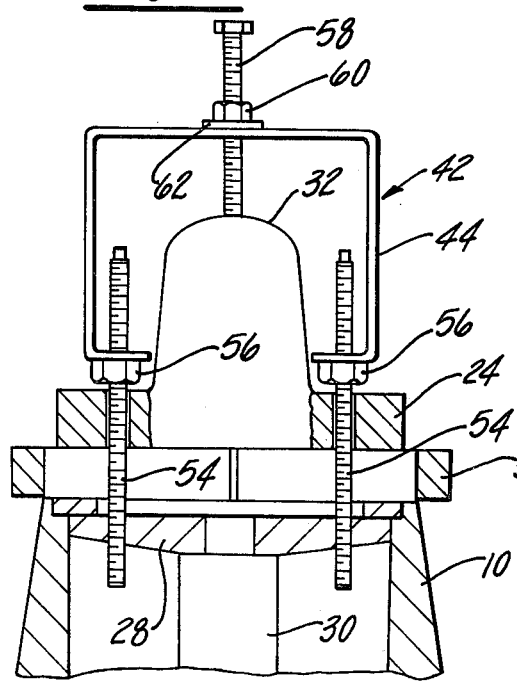
FIG. 4 is a sectional view similar to FIG. 3 and showing the manner in which the fixture is utilized to raise the ram.
Figure 5:
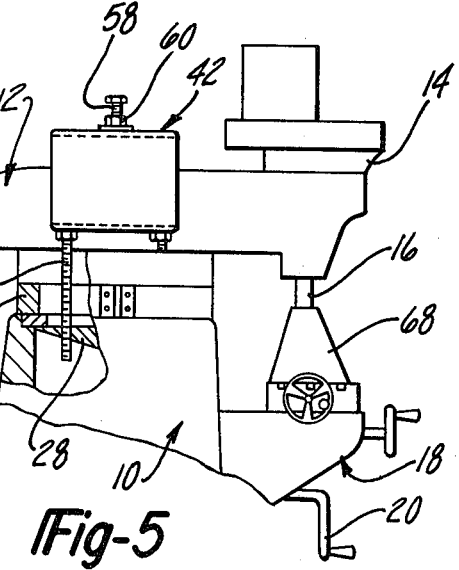
FIG. 5 is a fragmentary side elevational view, partly in section, showing the ram of the machine in the elevated position.

To elevate the ram the four mounting bolts 21 are removed and in their place are threaded four vertical guide screws 54. Nuts 56 are adjusted on screws 54 so that they lie in a horizontal plane spaced above the base flange 24 of the ram. Thereafter the U-shaped bracket 42 is inserted over these screws 54 so that the flanges 48 rest upon the nuts 56. Then a lift screw 58 is directed downwardly through the opening 52 in the bight section 46 of bracket 42 and threaded into the opening 34 in the ram so that it is locked therein. A nut 60 is threaded downwardly on lift screw 58 so that it bears against a washer 62 on the top face of bight section 46. FIG. 3 shows the fixture arranged on a milling machine in this manner.

Figure 6:
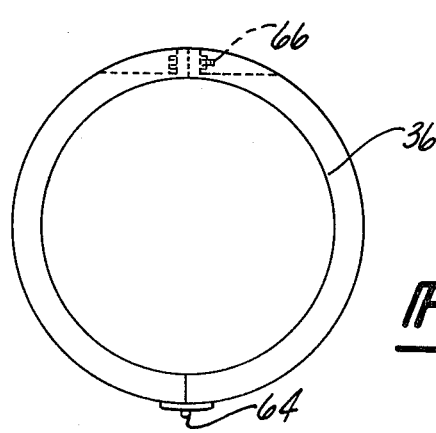
FIG. 6 is a plane view of the spacer employed between the ram and base of the machine.

To raise the ram 12 it is only necessary to turn nut 60 in a direction such as to thread it downwardly on lift screw 58. As nut 60 is rotated lift screw 58 is displaced upwardly and thereby lifts the entire ram of the milling machine base. The ram is guided vertically by the guide screws 54. After the ram has been raised in this manner the desired amount, the spacer 36 may be positioned between the base flange 24 of the ram and the upper end of base 10. As shown in FIG. 6, spacer 36 is preferably in the form of a ring consisting of two arcuate sections hinged together as at 64 and adapted to be locked together by a nut and bolt assembly as at 66. After the spacer ring 36 is inserted between the ram and the base, nut 60 is rotated in the opposite direction to lower the ram. When the ram is resting on spacer 36, lift screw 58 can be disengaged from the bolt hold 34 so that bracket 42 can be lifted off of the guide screws 54. Thereafter the guide screws 54 are removed and replaced with the mounting bolts 21 or similar bolts of longer length, if necessary. The ram is thus again securely mounted on the base of the machine in a position raised from its previous position by the height of spacer 36.

In the event that the weight of the tool head 14 tends to cause the ram to tilt as it is being raised by the lift screw 58, a spacer block 68 can be arranged between the work supporting surface of table 18 and the lower end of spindle 16. The table is raised by rotating crank 20 so that the upper end of spacer block 68 engages the lower end of the spindle. Then, to maintain the ram in a generally horizontal position while it is being elevated by rotating nut 60, the table can be incrementally raised while the nut 60 is turned.

I claim:

1. A fixture for raising the ram from the base of a milling machine of the type wherein the ram is mounted on the base by means of four mounting bolts, two at each side of the ram, which extend down through openings in a base flange on the ram and thread into registering threaded openings on a support mounted in a horizontally fixed position on the base, said ram having a raised central portion between said bolt openings which is provided with a threaded vertical opening for receiving an eye bolt for lifting the ram, said fixture comprising an inverted, generally U-shaped bracket having a pair of vertically extending legs interconnected at their upper ends by a bight section, the lower ends of said legs having laterally extending flanges thereon, said legs and bight section being dimensioned such that the bracket can be placed on the ram in an elevated position with the flanges registering vertically with the mounting bolt openings in the base flange of the ram with the bight section spanning the raised central portion of the ram and spaced thereabove, said laterally extending flanges having openings therein adapted to register with the bolt openings on the base flange of the ram, a guide screw extending vertically through each opening in said laterally extending flanges and adapted to be extended through the bolt openings in the base flange and threaded into the openings in said support after the mounting bolts have been removed therefrom, a stop on each screw located substantially above the lower end thereof and adapted to bear against the lower side of each of said flanges to support the bracket in said elevated position, said bight section having an opening therein registering vertically with the eye bolt opening in the central raised portion of the ram when the bracket is mounted in said elevated position, a lift screw extending downwardly through the opening in the bight section of the bracket and adapted to be threaded into and locked against rotation in said eye bolt opening and a nut threaded on said lift screw and adapted to bear down against the top face of the bight section so that, when the nut is threaded downwardly on the lift screw while bearing against the top face of the bight section, the lift screw is displaced upwardly to thereby raise the ram while it is guided vertically by the four guide screws which are threaded into said support.

2. A fixture as called for in claim 1 wherein said stops are adjustable vertically on said guide screws to vary the height at which the bracket is supported.

3. A fixture as called for in claim 2 wherein said stops comprise nuts threaded on the guide screws.

4. A fixture as called for in claim 1 wherein the flanges at the lower ends of said legs extend laterally inwardly toward each other.

5. A fixture as called for in claim 1 wherein the guide screws are dimensioned to have a close fit with the bolt receiving openings in the base flange of the ram to prevent substantial misalignment between the bolt receiving holes in the ram and the threaded mounting bolt openings in the support while the ram is being raised.

6. The method of raising the ram relative to the base of a milling machine of the type wherein the ram is mounted on the base in a fixed horizontal plane by means of four mounting bolts, two at each side of the ram, which extend downwardly through openings in a base flange on the ram and threaded into registering threaded openings in a support mounted on the base in a horizontally fixed position, said ram having a raised central portion between the bolt openings in the base flange provided with a threaded vertical opening for receiving an eye bolt for lifting the ram, said method comprising the steps of removing the four mounting bolts and replacing them with four longer guide screws provided with stops which are spaced above the base flange when the guide screws are threaded into the bolt openings in said support, providing an inverted, generally U-shaped bracket having vertical legs connected at their upper ends by a bight section and having laterally extending support flanges at their lower ends that are provided with openings to receive said guide screws, supporting the bracket on said stops so that the guide screws extend upwardly through the openings in the support flanges and the bight section of the bracket straddles and is spaced above the raised central portion of the ram, said bight section having a central vertical opening therein registering with the eye bolt opening in the ram, extending a lift screw downwardly through said central opening and threading it into the eye bolt opening so that it is locked therein, threading a nut down on the lift screw so as to bear down against the top face of the bight section and thereafter continuing threading the nut downwardly on the screw to displace the lift screw upwardly until the ram has been raised from the base the desired extent.

7. The method called for in claim 6 including the step of inserting a spacer between the base flange of the ram and said base after the ram has been raised, lowering the ram by rotating the nut in the opposite direction to displace the lift screw downwardly and thereafter replacing the guide screws with the same or longer mounting bolts.

8. The method called for in claim 7 wherein the spacer comprises at least two arcuately shaped sections which are inserted between the ram and base so as to extend circumferentially around the mounting bolt openings in the ram and the support.

9. The method called for in claim 6 wherein the ram has a laterally offset head provided with a vertical spindle and the machine base has a vertically adjustable work support table thereon located vertically below the spindle and including the step of arranging a spacer on the table so that it engages the lower end of the spindle when the table is raised and progressively raising the table as the ram is raised so as to support the weight of the laterally offset head.

10. The method called for in claim 6 wherein said stops are adjusted vertically on the guide screws such that the space between the top of the central raised portion of the ram and the overlying bight section of the bracket is at least slightly greater than the distance through which it is desired to raise the ram.

* * * * *